United States Patent Office 3,635,975
Patented Jan. 18, 1972

---

3,635,975
PYRROLO[2,3-d:4,5-d']DIPYRIMIDINE DERIVATIVES
Dong H. Kim, Wayne, and Arthur A. Santilli, Havertown, Pa., assignors to American Home Products Corporation, New York, N.Y.
No Drawing. Filed Nov. 4, 1969, Ser. No. 874,051
Int. Cl. C07d 57/14
U.S. Cl. 260—256.5 R                5 Claims

ABSTRACT OF THE DISCLOSURE

This invention concerns 4-amino-5-methyl-5H-pyrrolo[2,3-d:4,5-d']dipyrimidines and 5 - methyl-5H-pyrrolo[2,3-d:4,5-d']dipyrimidine-2,4-dithiols which are pharmacologically active as central nervous system depressants.

---

This invention relates to new and novel tricyclic pyrrolodipyrimidines. In particular, it is concerned with 4-amino-5-methyl - 5H - pyrrolo[2,3-d:4,5-d']dipyrimidines and 5-methyl-5H-pyrrolo[2,3-d:4,5-d']dipyrimidine-2,4-dithiols which in standard and accepted biological tests have exhibited central nervous system activity.

The new and novel compounds within the purview of the present invention are exemplified by the following formulae:

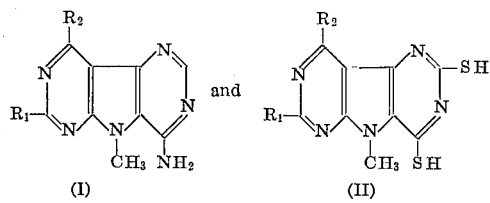

wherein $R_1$ is selected from the group consisting of lower alkyl, lower alkylthio, phenyl, halophenyl, lower alkylphenyl and lower alkoxyphenyl; and $R_2$ is selected from the group consisting of hydrogen, amino and lower alkylamino. The terms "lower alkyl," "lower alkoxy" and the like as employed herein are meant to include both branched and straight chain moieties containing from one to about six carbon atoms. The compounds of this invention which are exemplified by Formula I are called "4-amino - 5 - methyl - 5H - pyrrolo[2,3-d:4,5-d']dipyrimidines" such as: 4-amino-5-methyl-7-phenyl-5H-pyrrolo[2,3-d:4,5-d']dipyrimidine and 4,9-diamino-5-methyl-7-methylthio-5H-pyrrolo[2,3-d:4,5-d']dipyrimidine. Alternatively, the compounds of this invention which are depicted by Formula II are named "5-methyl-5H-pyrrolo[2,3-d:4,5-d']dipyrimidine-2,4-dithiols," for example: 5-methyl-7-phenyl - 5H - pyrrolo[2,3-d:4,5-d']dipyrimidine-2,4-dithiol and 9-amino-5-methyl-7-methylthio-5H-pyrrolo[2,3-d:4,5-d']dipyrimidine-2,4-dithiol.

The new and novel 4-amino-5-methyl-5H-pyrrolo[2,3-d:4,5-d']dipyrimidines of this invention are prepared by the process which is hereinafter exemplified:

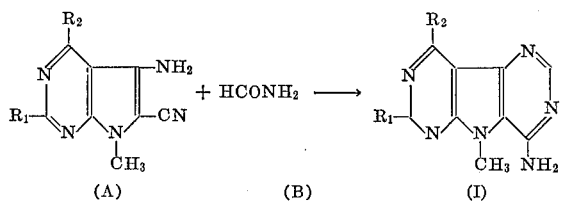

wherein $R_1$ and $R_2$ are defined as above. The reaction is effected by contacting an appropriate 5-amino-7-methyl-7H - pyrrolo[2,3-d]pyrimidine-6-carbonitrile (A) with formamide (B) at about reflux temperatures for a period of about one-half to about five hours.

When the reaction is complete, the resulting 4-amino-5-methyl-5H-pyrrolo[2,3-d:4,5-d']dipyrimidine (I) is separated by routine procedures. For example, the reaction mixture is cooled, filtered and the collected solid recrystallized from a suitable solvent, e.g. dimethylformamide and formamide.

The new and novel 5-methyl-5H-pyrrolo[2,3-d:4,5'd']dipyrimidine-2,4-dithiols of this invention are synthesized by the procedure depicted by the following reaction scheme:

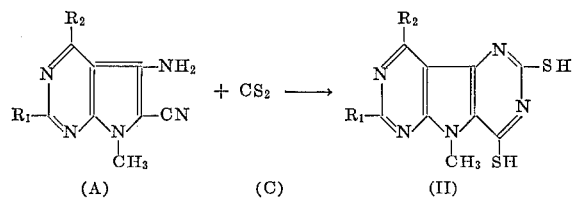

wherein $R_1$ and $R_2$ are defined as above. The reaction is effected by contacting an appropriate 5-amino-7-methyl-7H-pyrrolo[2,3-d]pyrimidine - 6 - carbonitrile (A) with carbon disulfide (C) in pyridine at about reflux temperatures for a period of about two to about five hours.

When the reaction is complete, the resulting 5-methyl-7-phenyl - 5H - pyrrolo[2,3-d:4,5-d']dipyrimidine-2,4-dithiol (II) is recovered by standard procedures. For example, the reaction mixture is cooled, filtered, and the collected solid recrystallized from an appropriate solvent, e.g. dimethylformamide and dimethylacetamide.

The 4-amino and 4-(lower)alkylamino substituted 5-amino - 7 - methyl - 7H - pyrrolo[2,3 - d]pyrimidine - 6-carbonitrile starting compounds employed in two aforesaid reactions are described and prepared in copending U.S. patent application, Ser. No. 874,053, entitled "4,5-Disubstituted-Pyrrolo[2,3-d]Pyrimidine-6-Carboxylic Acid Derivatives and Intermediates for Their Preparation" by Dong H. Kim and Arthur A. Santilli, filed in the U.S. patent office on the same day as the subject application. Therein, these starting compounds are prepared by reacting a 4,6-dihydroxypyrimidine with a formylating reagent, e.g. dimethylformamide and phosphoryl chloride, to afford a 4,6-dichloro-5-pyrimidine carboxaldehyde which is converted to the corresponding oxime and then dehydrated to a 4,6-dichloro-5-pyrimidine carbonitrile which is subjected to the step-wise displacement of the two chloro groups, first the 4-chloro by an alkylamine, then the 6-chloro by methylaminoacetonitrile and then cyclized by a Dieckmann type condensation. Alternatively, the 4-unsubstituted - 5 - amino - 7 - methyl - 7H - pyrrolo[2,3 - d]pyrimidine-6-carbonitrile starting compounds are described and prepared in copending U.S. patent application, Ser. No. 874,052, entitled "5-Substituted-Pyrrolo[2,3-d]Pyrimidine-6-Carboxylic Acid Derivatives and Intermediates for Their Preparation" by Dong H. Kim and Arthur A. Santilli, filed on the same day as the subject application. Therein these starting compounds are prepared by reacting a 4-hydroxy-5-pyrimidine carbonitrile with phosphoryl chloride to yield a 4-chloro-5-pyrimidine carbonitrile which is subjected to displacement of the 4-chloro group with methylaminoacetonitrile and then cyclized by a Dieckmann type condensation.

The new and novel 4-amino-5-methyl-5H-pyrrolo[2,3-d:4,5-d']dipyrimidines (I) and the 5-methyl-5H-pyrrolo[2,3-d:4,5-d']dipyrimidine-2,4-dithiols (II) of the present invention posses valuable pharmacological activity. In particular, these compounds in standard pharmacological procedures demonstrate nervous system activity and are useful as depressants. Because of this property they are of particular importance in producing a calming effect in animals.

In the pharmacological evaluation of the central nervous system depressant compounds of this invention the in vivo effects of the compounds of this invention are tested as follows:

The compound is administered orally and intraperitioneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The Eddy Hot-Plate Method [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity when administered at a dosage range of 127 to 400 mg./kg. There were no deaths in the test animals at the highest dose used, 400 mg./kg. orally and intraperitoneally.

When the compounds of this invention are employed as central nervous system depressants they may be administered to warm-blood animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients are starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution istonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

A mixture of 5-amino-7-methyl-2-phenyl-7H-pyrrolo[2,3-d]pyrimidine-6-carbonitrile (2.6 g.) and formamide (60 ml.) is refluxed for forty-five minutes, then chilled at about 5° C. overnight. The precipitate which deposits is collected on a filter, and washed with water several times to give 2.4 g. of product, M.P. 342–345° C. dec. Recrystallization from dimethylformamide affords 4-amino-5-methyl-7-phenyl-5H-pyrrolo-2,3 - d:4,5 - d']dipyrimidine, M.P. 352–354° C. dec.

*Analysis.*—Calcd. for $C_{15}H_{12}N_6$ (percent): C, 65.20; H, 4.38; N, 30.42. Found (percent): C, 64.99; H, 4.42; N, 30.59.

In a similar manner, 5-amino-7-methyl-2-(p-tolyl)-7H-pyrrolo[2,3-d]pyrimidine-6-carbonitrile is reacted with formamide to afford 4-amino-5-methyl-7-(p-tolyl)-5H-pyrrolo[2,3-d:4,5-d']dipyrimidine.

EXAMPLE II

A mixture of 3.0 g. of 4,5-diamino-7-methyl-2-methylthio-7H-pyrrolo[2,3-d]pyrimidine6-carbonitrile and 35 ml. of formamide is refluxed for three hours and then allowed to stand overnight. After being chilled in ice, the resulting solid is collected on a filter and recrystallized from formamide to give 4,9-diamino-5-methyl-7-methylthio 5H-pyrrolo[2,3-d:4,5-d']dipyrimidine, M.P. 335–338° C.

*Analysis.*—Calcd. for $C_{10}H_{11}N_7S$ (percent): C, 45.97; H, 4.24; N, 37.53; S, 12.25. Found (percent): C, 45.80; H, 4.44; N, 37.27; S, 12.06.

EXAMPLE III

When the procedure of Examples I–II is repeated to react an appropriate 5-amino-7-methyl-7H-pyrrolo[2,3-d]pyrimidine-6-carbonitrile with formamide, the following compounds are prepared:

4-amino-7-(p-chlorophenyl)-5-methyl-5H-pyrrolo-[2,3-d:4,5-d']dipyrimidine;

4-amino-5,7-dimethyl-9-methylamino-5H-pyrrolo-[2,3-d:4,5-d']dipyrimidine;

4,9-diamino-5-methyl-7-propylthio-5H-pyrrolo-[2,3-d:4,5-d']dipyrimidine;

4-amino-9-ethylamino-7-(m-ethylphenyl)-5-methyl-5H-pyrrolo[2,3-d:4,5-d']dipyrimidine;

4-amino-7-(p-iodophenyl)-5-methyl-5H-pyrrolo-[2,3-d:4,5-d']dipyrimidine;

4-amino-7-ethyl-5-methyl-9-propylamino-5H-pyrrolo-[2,3-d:4,5-d']dipyrimidine;

4-amino-7-ethylthio-5-methyl-5H-pyrrolo[2,3-d:4,5-d']dipyrimidine;

4,9-diamino-7-butyl-5-methyl-5H-pyrrolo[2,3-d:4,5-d']dipyrimidine;

4,9-diamino-7-(p-methoxyphenyl)-5-methyl-5H-pyrrolo-[2,3-d:4,5-d']dipyrimidine;

4-amino-7-(p-ethoxyphenyl)-5-methyl-5H-pyrrolo-[2,3-d:4,5-d']dipyrimidine;

4-amino-7-(p-bromophenyl)-5-methyl-5H-pyrrolo-[2,3-d:4,5-d']dipyrimidine; and 4-amino-7-(p-fluorophenyl)-5-methyl-5H-pyrrolo-[2,3-d:4,5-d']dipyrimidine.

EXAMPLE IV

A mixture of 3.0 g. of 4,5-diamino-7-methyl-2-methylthio-7H-pyrrolo[2,3-d]pyrimidine-6-carbonitrile, 25 ml. of carbon disulfide and 25 ml. of pyridine is heated at reflux for four and a half hours. After standing overnight, the reaction mixture is chilled in ice, filtered and the collected material (4.0 g.) is washed with ethanol. The crude product is recrystallized from dimethylacetamide to give 9-amino-5-methyl - 7 - methylthio-5H-pyrrolo[2,3-d:4,5-d']dipyrimidine-2,4-dithiol, M.P. >360° C.

*Analysis.*—Calcd. for $C_{10}H_{10}N_6S_3$ (percent): C, 38.71; H, 3.25; N, 27.09; S, 30.95. Found (percent): C, 39.06; H, 3.38; N, 27.00; S, 31.21.

EXAMPLE V

A mixture of 5-amino-7-methyl-2-phenyl-7H-pyrrolo-[2,3-d]pyrimidine-6-carbonitrile (2.5 g.), carbon disulfide (20 ml.), and pyridine (20 ml.) is refluxed for four hours and then allowed to stand overnight. After being chilled in ice, the resulting precipitate is collected on a filter and washed with ethanol several times. The product amounts to 4.7 g. and melts at 355° C. with decomposition. Recrystallization from dimethylformamide affords 5-methyl-7-phenyl - 5H-pyrrolo[2,3-d:4,5-d']dipyrimidine - 2,4 - dithiol, M.P. 353° C. dec.

*Analysis.*—Calcd. for $C_{15}H_{11}N_5S_2$ (percent): C, 55.38; H, 3.41; N, 19.68; S, 21.53. Found (percent): C, 55.07; H, 3.87; N, 19.66; S, 21.34.

EXAMPLE VI

When the procedure of Examples IV–V is repeated to react an appropriate 4-amino-7-methyl-7H-pyrrolo[2,3-d]

pyrimidine-6-carbonitrile with carbon disulfide in pyridine, compounds of the following formula are synthesized:

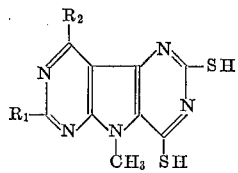

wherein $R_1$ and $R_2$ are defined as follows:

| $R_1$ | $R_2$ |
|---|---|
| p-tolyl | hydrogen |
| ethylthio | methylamino |
| methyl | hydrogen |
| m-butylphenyl | amino |
| p-methoxyphenyl | amino |
| p-chlorophenyl | hydrogen |
| ethyl | ethylamino |
| propylthio | amino |
| p-bromophenyl | methylamino |
| butyl | butylamino |
| p-iodophenyl | amino |
| p-fluorophenyl | hydrogen |
| o-ethoxyphenyl | amino |
| p-propoxyphenyl | hydrogen |

What is claimed is:

1. A compound selected from the group consisting of those having the formulae:

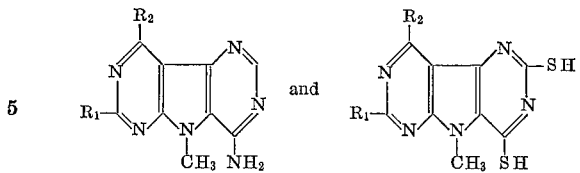

wherein $R_1$ is selected from the group consisting of lower alkyl, lower alkylthio, phenyl, halophenyl, lower alkylphenyl and lower alkoxyphenyl; and $R_2$ is selected from the group consisting of hydrogen, amino and lower alkylamino.

2. A compound as described in claim 1 which is: 4-amino - 5 - methyl - 7 - phenyl-5H-pyrrolo[2,3-d:4,5-d']dipyrimidine.

3. A compound as described in claim 1 which is: 5-methyl - 7 - phenyl-5H-pyrrolo[2,3-d:4,5-d']dipyrimidine-2,4-dithiol.

4. A compound as described in claim 1 which is: 4,9-diamino - 5 - methyl-7-methylthio 5H-pyrrolo[2,3-d:4,5-d']dipyrimidine.

5. A compound as described in claim 1 which is: 9-amino - 5 - methyl - 7 - methylthio-5H-pyrrolo[2,3-d:4,5-d']dipyrimidine-2,4-dithiol.

References Cited

UNITED STATES PATENTS 3,531,482  9/1970  Ott _____ 260—256.4 F

ALEX MAZEL, Primary Examiner

R. J. GALLAGHER, Assistant Examiner

U.S. Cl. X.R.

260—256.4 F; 424—251

PO-1050
(5/69)

UNITED STATES PATENT OFFICE
CERTIFICATE OF CORRECTION

Patent No. __3,635,975__          Dated __January 18, 1972__

Inventor(s) __Dong H. Kim and Arthur Santilli__

It is certified that error appears in the above-identified patent and that said Letters Patent are hereby corrected as shown below:

Column 1, line 65, structural formula (I) should be as shown below:

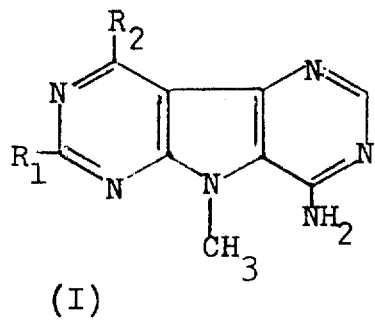

(I)

Column 2, line 15, structural formula (A) should be as shown below:

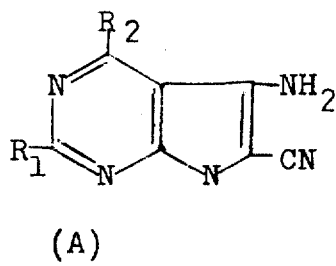

(A)

Signed and sealed this 5th day of December 1972.

SEAL)
ttest.

EDWARD M. FLETCHER, JR.
Attesting Officer

ROBERT GOTTSCHALK
Commissioner of Patents